(12) United States Patent
Trifonov et al.

(10) Patent No.: US 9,965,016 B2
(45) Date of Patent: May 8, 2018

(54) POWER ASSET COMMAND AND CONTROL ARCHITECTURE

(71) Applicant: International Power Supply AD, Sofia (BG)

(72) Inventors: Stoil Rangelov Trifonov, Sofia (BG); Filip Stoilov Rangelov, Sofia (BG); Alexander Stoilov Rangelov, Sofia (BG)

(73) Assignee: International Power Supply AD, Sofia (BG)

( * ) Notice: Subject to any disclaimer, the term of this patent is extended or adjusted under 35 U.S.C. 154(b) by 0 days. days.

(21) Appl. No.: 15/065,543

(22) Filed: Mar. 9, 2016

(65) Prior Publication Data
US 2017/0262037 A1  Sep. 14, 2017

(51) Int. Cl.
G06F 1/32 (2006.01)
G05B 15/02 (2006.01)
H02J 13/00 (2006.01)

(52) U.S. Cl.
CPC .......... *G06F 1/3209* (2013.01); *G05B 15/02* (2013.01); *G06F 1/3212* (2013.01); *H02J 13/0013* (2013.01)

(58) Field of Classification Search
CPC ..... G06F 1/3209; G06F 1/3212; G05B 15/02; H02J 13/0013
See application file for complete search history.

(56) References Cited

U.S. PATENT DOCUMENTS

| 5,736,933 | A | * | 4/1998 | Segal | H04L 1/1874 340/7.22 |
| 6,047,222 | A | * | 4/2000 | Burns | G05B 19/4184 700/2 |
| 6,252,881 | B1 | * | 6/2001 | Samoylenko | H04L 12/4035 370/433 |
| 6,747,959 | B1 | * | 6/2004 | Ho | H04W 72/0446 370/282 |

(Continued)

FOREIGN PATENT DOCUMENTS

| EP | 2081273 A2 | 7/2009 |
| EP | 2658027 A1 | 10/2013 |
| WO | WO 2014/057304 A1 | 4/2014 |

OTHER PUBLICATIONS

Gaushell, Dennis J., and Wayne R. Block. "SCADA communication techniques and standards." IEEE computer applications in power 6.3 (1993): 45-50.*

(Continued)

*Primary Examiner* — M. N. Von Buhr
(74) *Attorney, Agent, or Firm* — Sterne, Kessler, Goldstein & Fox

(57) ABSTRACT

Disclosed herein are system and method embodiments for a power tracking and control architecture. An embodiment operates by compiling a data telegram, wherein the data telegram comprises a plurality of blocks; sending, by a first communication path of the controller, the data telegram to a second tier of the tiered network, wherein at least one power asset of the second tier of the tiered network is configured to update a power profile according to at least one block of the data telegram; and receiving, by a second communication path of the tiered network, an update from the at least one power asset of the second tier of the tiered network.

30 Claims, 8 Drawing Sheets

(56) References Cited

U.S. PATENT DOCUMENTS

| | | | |
|---|---|---|---|
| 8,666,560 B2* | 3/2014 | Lu | H04L 12/2807 323/234 |
| 9,281,689 B2* | 3/2016 | Boardman | H02J 3/26 |
| 9,622,256 B2* | 4/2017 | Zhao | H04W 72/10 |
| 2005/0034023 A1* | 2/2005 | Maturana | G06Q 10/06 714/37 |
| 2006/0229738 A1* | 10/2006 | Bhandiwad | G05B 19/4185 700/9 |
| 2010/0165923 A1* | 7/2010 | Tseng | H04L 45/48 370/328 |
| 2011/0082598 A1 | 4/2011 | Boretto et al. | |
| 2012/0065802 A1 | 3/2012 | Seeber et al. | |
| 2012/0131217 A1* | 5/2012 | Delorme | G06Q 10/06 709/230 |
| 2012/0271576 A1 | 10/2012 | Kamel et al. | |
| 2012/0323382 A1 | 12/2012 | Kamel et al. | |
| 2012/0324273 A1* | 12/2012 | Shaffer | H04L 45/02 714/4.12 |
| 2013/0016612 A1* | 1/2013 | Vasseur | H04L 45/48 370/235 |
| 2013/0041516 A1 | 2/2013 | Rockenfeller et al. | |
| 2014/0039702 A1* | 2/2014 | Ilic | G05B 15/02 700/286 |
| 2014/0153383 A1* | 6/2014 | Mabilleau | F24H 7/00 370/222 |
| 2014/0177477 A1* | 6/2014 | Cachin | H04L 45/128 370/256 |
| 2014/0236318 A1* | 8/2014 | Esposito | G05B 11/01 700/79 |
| 2014/0249688 A1* | 9/2014 | Ansari | H02J 3/46 700/297 |
| 2014/0277788 A1* | 9/2014 | Forbes, Jr. | G05F 1/66 700/286 |
| 2014/0307553 A1* | 10/2014 | Fung | H04L 47/125 370/235 |
| 2014/0325255 A1* | 10/2014 | Jensen | G06F 11/0793 714/3 |
| 2015/0207645 A1* | 7/2015 | Kanabar | G05B 15/02 700/286 |
| 2015/0346753 A1* | 12/2015 | Gan | G06Q 50/06 700/295 |
| 2015/0370278 A1* | 12/2015 | Li | G05F 1/67 323/234 |
| 2016/0021018 A1* | 1/2016 | Hui | H04L 47/624 370/412 |
| 2016/0043552 A1* | 2/2016 | Villanueva, Jr. | H02J 3/005 700/291 |
| 2016/0064935 A1 | 3/2016 | Gao et al. | |
| 2016/0186728 A1* | 6/2016 | Mazur | F03D 3/0418 416/1 |
| 2016/0248255 A1* | 8/2016 | Rive | G05B 15/02 |
| 2016/0309352 A1* | 10/2016 | Yuan | H02J 13/0079 |
| 2016/0344188 A1 | 11/2016 | Carlson | |
| 2017/0005473 A1* | 1/2017 | Somani | H02J 3/381 |
| 2017/0063093 A1* | 3/2017 | Wang | H02J 3/381 |
| 2017/0090467 A1* | 3/2017 | Cincea | H04L 12/40013 |
| 2017/0102726 A1* | 4/2017 | Goldsmith | G05F 1/66 |
| 2017/0153633 A1* | 6/2017 | Christensen | G05B 19/41865 |

OTHER PUBLICATIONS

Kalapatapu, Rao. "SCADA protocols and communication trends." ISA2004 (2004).*

Marihart, Donald J. "Communications technology guidelines for EMS/SCADA systems." IEEE Transactions on Power Delivery 16.2 (2001): 181-188.*

TIB, NCS. "04-1: National Communications, Technical Information Bulletin 04-1 Supervisory Control and Data Acquisition (SCADA) Systems, Oct. 2004." Office of the Manager, National Communications System, PO box 4052: 22024-4052.*

International Search Report and Written Opinion of the International Searching Authority directed to related International Patent Application No. PCT/IB2017/051369, dated May 16, 2017; 13 pages.

International Search Report and Written Opinion of the International Searching Authority directed to International Patent Application No. PCT/IB2017/058144, dated Feb. 12, 2018; 16 pages.

* cited by examiner

POWER ASSET COMMAND AND CONTROL ARCHITECTURE

BACKGROUND

With a rise in the reliance on renewable energy, new challenges arise in supplying power to off-grid facilities. Such challenges include the storage of renewable energy, cost of renewable energy, and reliability of renewable energy. Today, hybrid power systems allow for off-grid facilities to be powered by a variety of power generation sources, including renewable sources. These systems allow off-grid facilities to rely on renewable energy sources when available, but also allow facilities to use power from a grid when renewable energy sources are not available or viable.

However, these hybrid power systems are often costly to install and require multiple units in order to utilize power from a variety of sources. Due to this, a large amount of effort is required to integrate and maintain these separate units together. The use of multiple units also requires customers to designate a large amount of space for the units, space an off-site facility may not have. Further, when one unit malfunctions or deactivates, the hybrid power system may not function until that unit is repaired or replaced, causing a loss of time to the off-site facility.

SUMMARY

Provided herein are system, apparatus, article of manufacture, method and/or computer program product embodiments, and/or combinations and sub-combinations thereof, for a power tracking and control architecture.

An embodiment includes a power management control system. The power management control system may include a plurality of power assets arranged in a tiered network that is arranged in a tree architecture. A first tier of this tiered network may comprise a controller configured to output a data telegram communicating a desired output for a power generation source. A second tier of this tiered network may comprise at least one power asset configured to receive, by a first communication path of the tiered network, the data telegram from the first tier, adjust an output of the power generation source according to the data telegram from the first tier, and report, by a second communication path of the tiered network, an update of the power generation source to the first tier. Further, a third tier of this tiered network may comprise at least one power asset configured to receive, by the first communication path of the tiered network, the data telegram from the second tier.

Another embodiment includes, in a tiered network comprising a controller and a plurality of power assets arranged in a tree architecture, a system. The system includes a memory and at least one processor of a second tier of the tiered network coupled to the memory. The processor may be configured to receive, by a first communication path of the tiered network, a data telegram from a first tier of the tiered network, wherein the data telegram comprises a desired output for a power generation source visualize a plurality of available analytic data in a graphical user interface. Further, the processor may be configured to adjust the output of the power generation source according to the data telegram. Additionally, the processor may be configured to report, by a second communication path of the tiered network, an update of the power generation source to the first tier of the tiered network and send, by the first communication path of the tiered network, the data telegram to a third tier of the tiered network.

A further embodiment includes, in a tiered network comprising a controller and a plurality of power assets arranged in a tree architecture, a method. The method may comprise compiling a data telegram, wherein the data telegram comprises a plurality of blocks. The method may also comprise sending, by a first communication path of the controller, the data telegram to a second tier of the tiered network, wherein at least one power asset of the second tier of the tiered network is configured to update a power profile according to at least one block of the data telegram. Additionally, the method may comprise receiving, by a second communication path of the tiered network, an update from the at least one power asset of the second tier of the tiered network.

BRIEF DESCRIPTION OF THE DRAWINGS

The drawing are representative of embodiments of the invention. In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for exporting analytic data.

Figure 1:
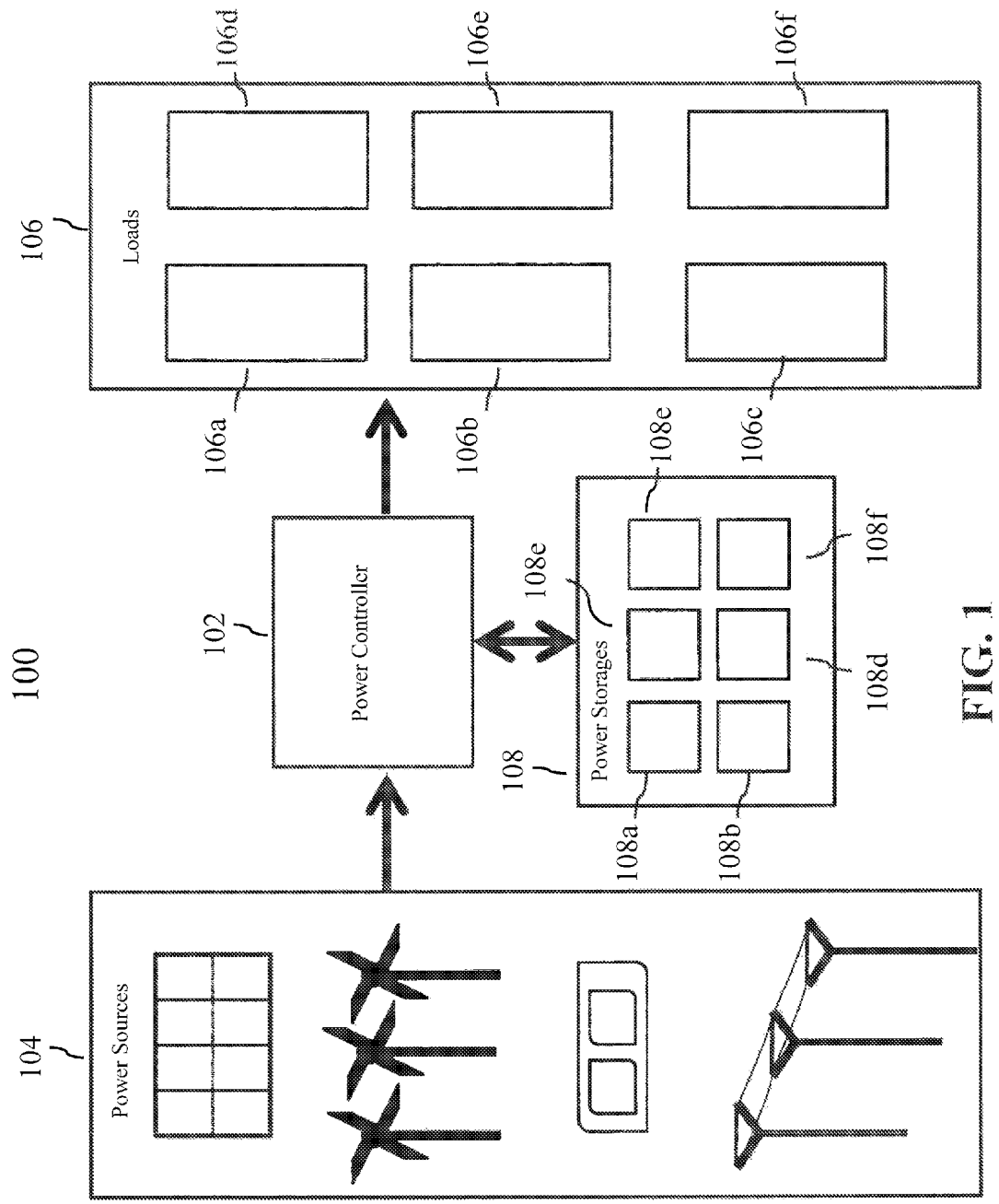
FIG. 1 is a diagram illustrating an example of a hybrid power control system 100, according to an embodiment.

FIG. 1 is a diagram illustrating an example of a hybrid power control system 100, according to an embodiment. The hybrid power control system 100 may comprise power controller 102, plurality of power generation sources 104 (comprising power sources 104a, 104b, 104c, and 104d), plurality of loads 106 (comprising loads 106a, 106b, 106c, 106d, 106e, and 106f), and plurality of power storages 108 (comprising power storage 108a, 108b, 108c, 108d, 108e, and 108f). According to an embodiment, power generations sources 104 may comprise a plurality of power generation source types such as photovoltaic solar panels, wind turbines, diesel generators, electrical grids, hydroelectric sources, or any combination thereof—to name a few.

According to an embodiment, power characteristics of the power generated by power generation sources 104 may be dependent on environmental conditions. The power characteristics may comprise the frequency, voltage, current, amplitude, or any combination thereof, of the power generated. The environmental conditions may comprise solar irradiance, temperature of the environment, temperature of the power generation source, mass of the air, or any combination thereof—to name a few. For example, power generation sources 104 may comprise a photovoltaic solar panel which outputs power at a voltage that is dependent upon solar irradiance (i.e. the voltage of the power generated by the solar panel changes as the solar irradiance changes).

According to an embodiment, power generation sources 104 may be connected to power controller 102. Power controller 102 may comprise a microcontroller unit (MCU), maximum power point tracker (MPPT), grid rectifier, distributed generation (DG) rectifier, inverters, or any combination thereof—to name a few. In an embodiment, power controller 102 may control characteristics of the power generated by power generation sources 104. Power controller 102 may control these power characteristics through adjusting loads attached to a power generation sources, pulse width modulation (PWM), maximum power point tracking, automatic gain control (AGC), or any combination thereof—to name a few examples.

In another embodiment, power controller 102 may maintain desired characteristics of power generated by power sources 104 wherein the power generated is dependent on environmental conditions. Power controller 102 may maintain desired characteristics of the power generated through the use of PWM or maximum power point tracking, to name a couple of examples. For example, the voltage of power generated by a photovoltaic solar panel may change based on the solar irradiance. Power controller 102 may be configured to maintain a desired voltage for the power generated by the photovoltaic solar panel through the use of PWM or maximum power point tracking.

In an embodiment, power controller may control the activation and deactivation of power generation sources 104. Power controller 104 may control the activation/deactivation of power generation sources 104 through the sending of activate/deactivate commands, electronic switching, mechanical switching, or any combination thereof—to name some examples.

In an embodiment, power generated by powers generation sources 104 is fed to loads 106 and power storage 108. Loads 106 may comprise a plurality of load types found at different locations such load types found at oil pipelines, telecommunication stations, residential homes, oil rigs, cities, offices, factories, military facilities, or any combination thereof. Each of the load types may have different power requirements for the loads to operate. Such power requirements may comprise desired frequencies, voltages, currents, amplitudes, or any combination thereof. According to an embodiment, the power flow from power generation sources 104 to loads 106 is regulated by power controller 102 based on these power requirements, as discussed further in the discussion of FIG. 2.

In an embodiment, power storages 108 may comprise a plurality of power storage types such as batteries, flywheels, capacitors, deep-cycle batteries, or any combination thereof—to name a few. Each of the power storage types may have different power requirements to allow the power storage types to store energy. Such power requirements may comprise desired frequencies, voltages, currents, amplitudes, or any combination thereof. For example, power storage 108 may comprise a plurality of batteries that require a desired voltage in order to charge. According to an embodiment, the power flow from power generation sources 104 to power storage 108 is regulated by power controller 102 based on these power requirements, as discussed further in the discussion of FIG. 2.

Figure 2:
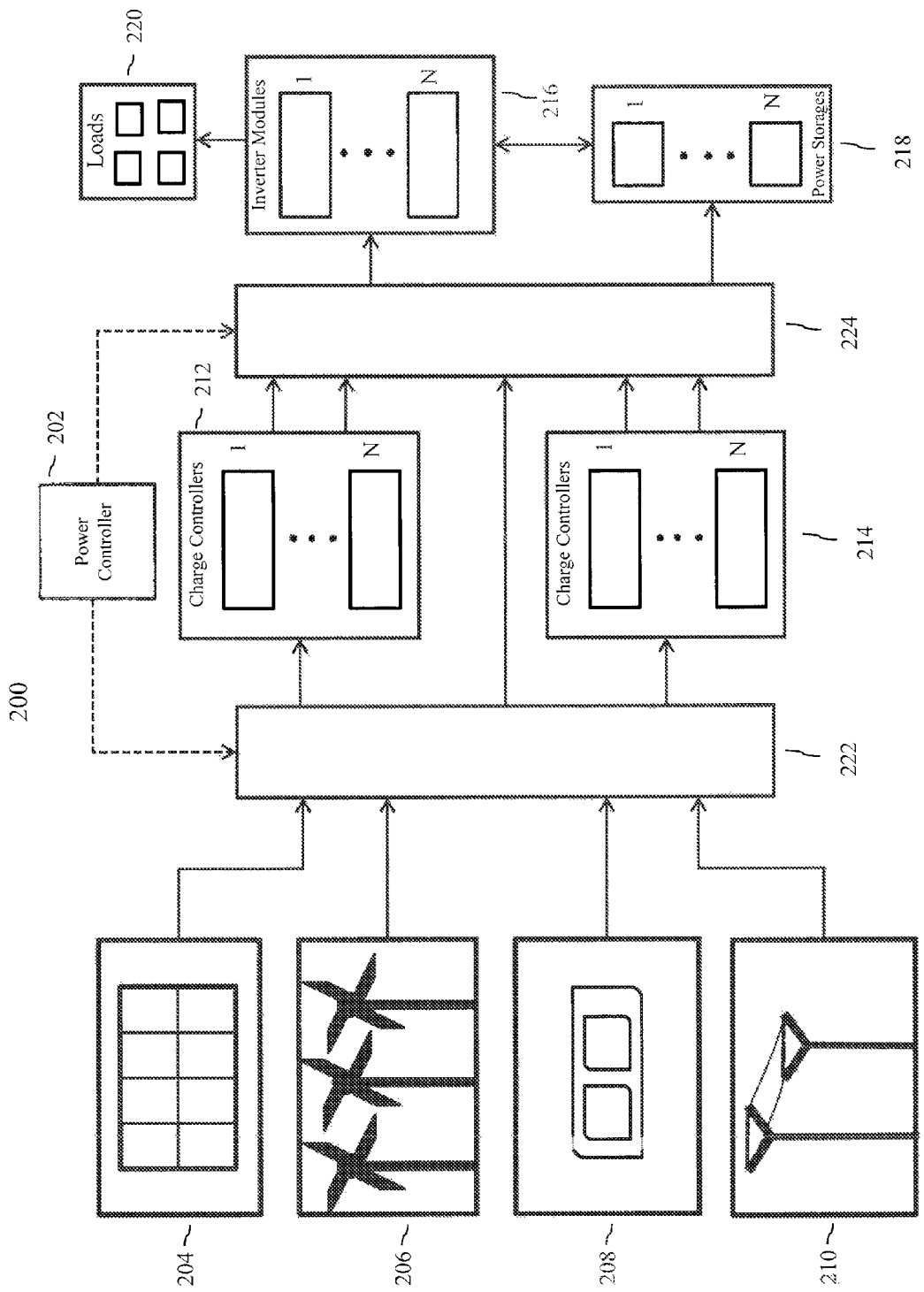
FIG. 2 is a diagram illustrating an example of a hybrid power control unit 200, according to an embodiment.

FIG. 2 is a diagram illustrating an example of a hybrid power control unit 200, according to an embodiment. The hybrid power control unit 200 may comprise power controller 202, a plurality of charge controllers 212, a second plurality of charge controllers 214, a plurality of inverter modules 216, or any combination thereof. In an embodiment, the hybrid power control system may control the distribution of power from a plurality of power sources (204, 206, 208, and 210 respectively) to plurality of loads 220 and plurality of power storages 218. The plurality of power sources may comprise photovoltaic solar panels 204, wind turbines 206, diesel generators 208, an electrical grid 210, or any combination thereof—to name a few examples. Power controller 202 may control the flow of the power outputs from the power sources to charge controllers 212, charge controllers 214, power storages 218, inverter modules 216, or any combination thereof. Power controller 202 may comprise a MCU, a computer, a mobile device, or any combination thereof—to name a few examples.

According to an embodiment, power controller 202 may control the flow of the power outputs through multiplexers 222 and 224. Multiplexers 222 and 224 may comprise a plurality of electrical switches, a plurality of logic gates, digital multiplexers, or any combination thereof—to name a few examples.

The power outputs of each of the power sources may be fed into multiplexer 222. Multiplexer 222 may receive a command from power controller 202 that determines how the outputs from the power sources are forwarded to charge controllers 212, charge controllers 214, power storages 218, multiplexer 224, or any combination thereof. The power outputs of multiplexer 222, charge controllers 212 and charge controllers 214 may be fed into multiplexer 224. Multiplexer 224 may receive a command from power controller 202 that determines how the outputs from multiplexer 222, charge controllers 212 and charge controllers 214 are forwarded to power storages 218 and inverters 216.

For example, the power sources may comprise photovoltaic solar panels 204, wind turbines 206, diesel generators 208, and an electrical grid 210. The outputs of these power sources may be fed into multiplexer 222. Multiplexer 222 may receive a command from controller 202 that comprises data instructing multiplexer 222 to forward the power output from photovoltaic solar panels 204 to charge controllers 212, the power output from wind turbines 206 to multiplexer 224, and the power output from diesel generator 208 to charge controllers 214.

Building on this example, multiplexer 224 may receive a command from power controller 202 that comprises data instructing multiplexer 224 to forward the power output from charge controllers 212 to inverter modules 216, the power output from wind turbines 206 to power storages 218, and the output from charge controllers 214 to power storages 218.

Charge controllers 212 and 214 may comprise MPPTs, grid rectifiers, DG rectifiers, PWN controllers, or any combination thereof. In an embodiment, charge controllers 212 and 214 may receive commands from power controller 202 comprising a power profile. The power profile may comprise data to control the power characteristics of the power generated by the plurality of power sources and output a power with desired characteristics to meet the power requirements of power storages 218 and loads 220.

For example, power storages 218 may comprise a plurality of batteries requiring direct current (DC) to charge. By way of multiplexer 222, the power output from diesel generator 208 (in alternating current (AC)) may be fed to charge controllers 214 which comprise DG rectifiers. Charge controllers 214 may receive a power profile from power controller 202 comprising data for charge controllers 214 to rectify the power output from the diesel generator from AC to DC.

As another example, loads 220 may comprise a type of load that requires a desired voltage to operate. By way of multiplexer 222, the power output from photovoltaic solar panels 204 may be fed to charge controllers 212 which comprise MPPTs. Charge controllers 212 may receive a power profile from power controller 202 to control the voltage of the power output of the photovoltaic solar panels to meet the desired voltage required for the loads to operate.

According to an embodiment, loads 220 may comprise types of loads that require AC to operate. Inverter modules 216 may convert power received from the power generation sources and charge controllers from DC to AC, if necessary. For example, a power output from wind turbines 206 may output in DC and be fed to inverter modules 216. Inverter modules 216 may convert the power from wind turbines 206 from DC to AC to meet the requirements of the types of loads of loads 220.

Figure 3:
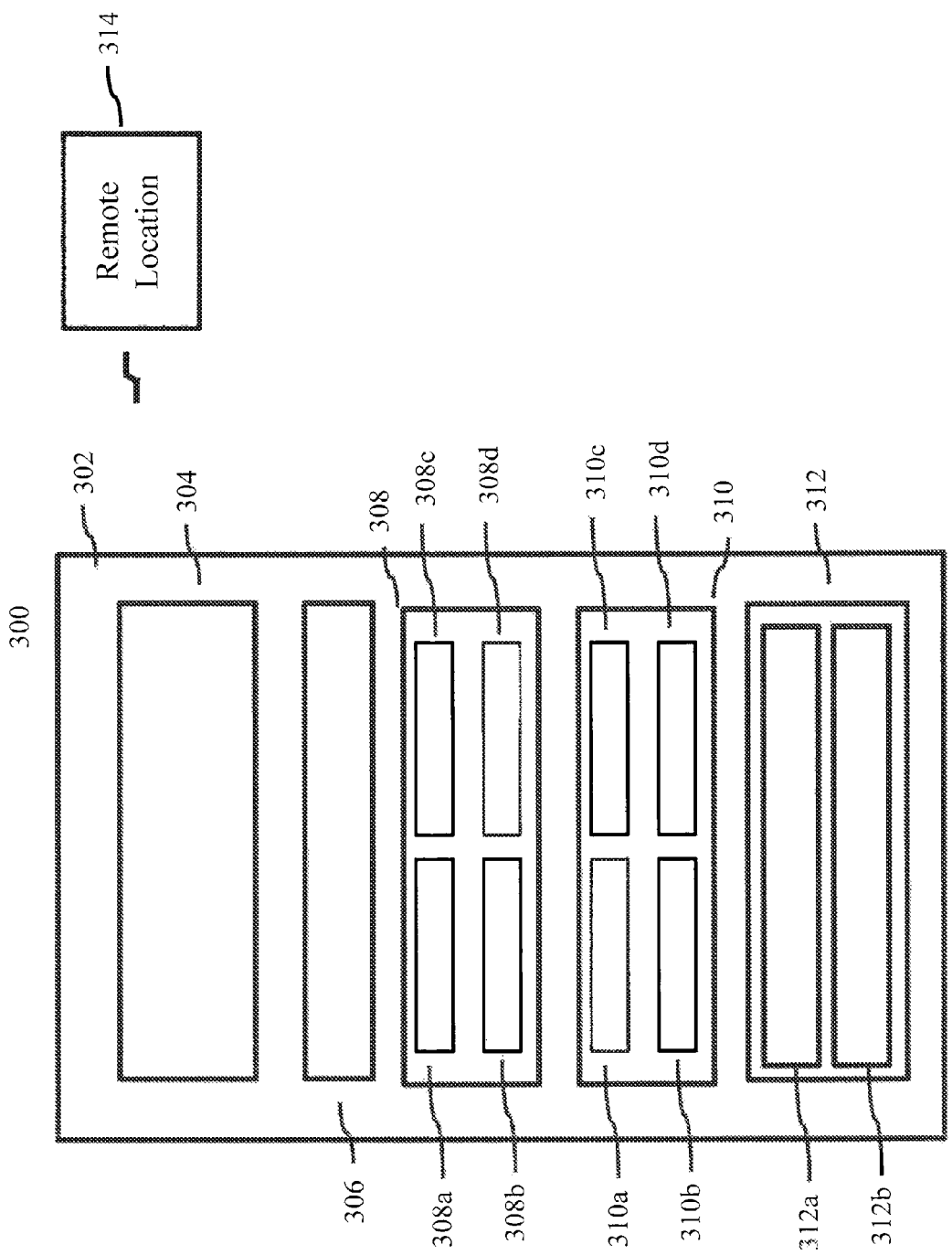
FIG. 3 is a diagram illustrating an example of hybrid power control module 300, according to an embodiment.

FIG. 3 is a diagram illustrating an example of hybrid power control module 300, according to an embodiment. In an embodiment, hybrid power control module may comprise a power distribution unit (PDU) 304, MCU 306, a plurality of charge controllers 308 comprising charge controller modules 308a-d, a plurality of rectifiers 310 comprising rectifier modules 310a-d, and a plurality of inverters 312 comprising inverter modules 312a and 312b. According to an example embodiment, hybrid power control module 300 may be located in a single housing 302.

PDU 304 may comprise a plurality of electrical input connections and a plurality of electrical output connections. The electrical input and output connections may be rated for a variety of voltages, currents, frequencies, or any combination thereof—to name a few.

In an embodiment, the electrical input connections of PDU 304 may be connected to a plurality of power generation sources. Power generated from the plurality of generation sources may flow from the power generation sources to charge controllers 308, rectifiers 310, and inverters 312 of hybrid power control module 300 via the electrical input connections of PDU 304, with the flow of power being controlled by MCU 306 as described in the discussion of FIG. 2.

According to an embodiment, power outputs from the power generation sources as well as charge controllers 308, rectifiers 310, and inverters 312 of hybrid power control module 300, may flow to the electrical output connections of PDU 304. The electrical output connections of PDU 304 may be connected to power storages 218 and loads 220. The flow of power from the power generation sources and charge controllers 308, rectifiers 310, and inverters 312 to power storages 218 and loads 220, connected via the electrical output connections of PDU 304, may be controlled by MCU 306 as described in the discussion of FIG. 2.

In an embodiment, MCU 306, charge controllers 308, rectifiers 310, and inverters 312 of hybrid power control module 300 may be hot swappable. When MCU 306, a charge controller 308, rectifier 310, or inverter 312 of hybrid power control module 300 is removed and replaced with another power asset of the same type, the newly installed power asset will continue to operate as the power asset that it replaced. For example, a charge controller 308 in hybrid power control module 300 may be programmed to receive a power output from photovoltaic solar panels 204, control the voltage of the power output from photovoltaic solar panels 204 to a desired voltage, and output the controlled power output to power storages 218. When this charge controller 308 is removed from hybrid power control module 300 and replaced with a new charge controller, the new charge controller will continue to operate as the replaced charge controller 308.

According to an embodiment, hybrid power control module 300 may include a memory. The memory may comprise ROM, PROM, EEPROM, or any combination thereof—to name a few examples. The memory of hybrid power control module 300 may be connected to MCU 306, charge controllers 308, rectifiers 310, and inverters 312 and may store power profiles received by MCU 306, charge controllers 308, rectifiers 310, and inverters 312. For example, a charge controller of hybrid power control module 300 may receive a power profile from MCU 306 instructing the charge controller to control the voltage of the power output from photovoltaic solar panels 204 to a desired voltage for power storages 218. The memory of hybrid power control module 300 may store this command and apply it to any charge controller that replaces the original.

Figure 5:
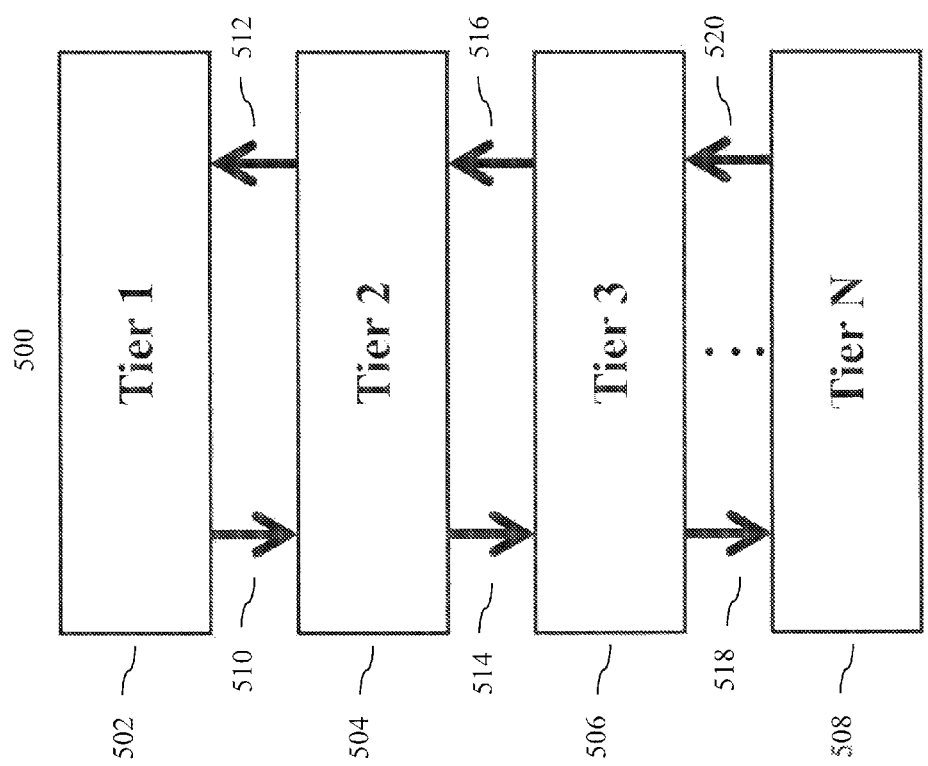
FIG. 5 is a diagram illustrating bi-directional communication between one through N tiers of system architecture 400, according to an embodiment.

In another embodiment, a power asset that replaces an original asset may communicate with other power assets in the system through the bi-directional communication of the system architecture further discussed in FIG. 5. By communicating with the other power assets in the system, a newly installed power asset may ascertain its placement and role within the system and operate as the power asset that was replaced.

For example, a charge controller of hybrid power control module 300 may be programmed to receive a power output from photovoltaic solar panels 204, control the voltage of the power output from photovoltaic solar panels 204 to a desired voltage, and output the controlled power output to power storages 218. When this charge controller is removed and replaced with a new charge controller, the new charge controller may communicate with the other power assets in the system to ascertain its placement and role in the system and will operate as the charge controller that was replaced.

In an embodiment, MCU 306 may receive signals from remote location 314. Remote location may comprise a computer, a mobile device, a mobile phone, a MCU, or any combination thereof—to name a few examples. MCU 306 may receive signals from remote location 314 via radio, intranet, internet, WIFI, a cellular network, or any combination thereof.

Figure 6:
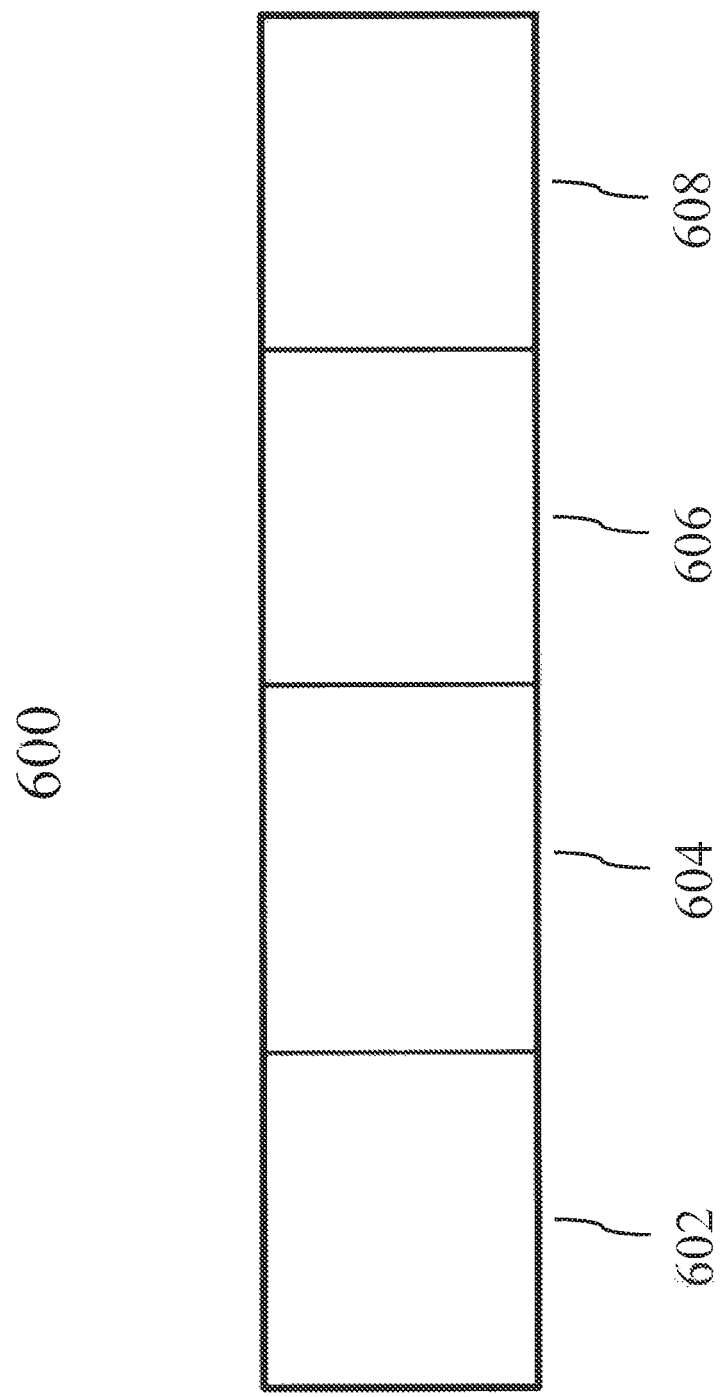
FIG. 6 is a diagram illustrating data telegram 600, according to an embodiment.

According to an embodiment, when MCU 306 receives a signal from remote location 314, MCU 306 may compile a data telegram, as depicted in the discussion of FIG. 6. The data telegram may comprise commands for the power flow and power profiles for charge controllers 308, rectifiers 310, and inverters 312 of hybrid power control module 300 as described in the discussion of FIG. 2.

Figure 4:
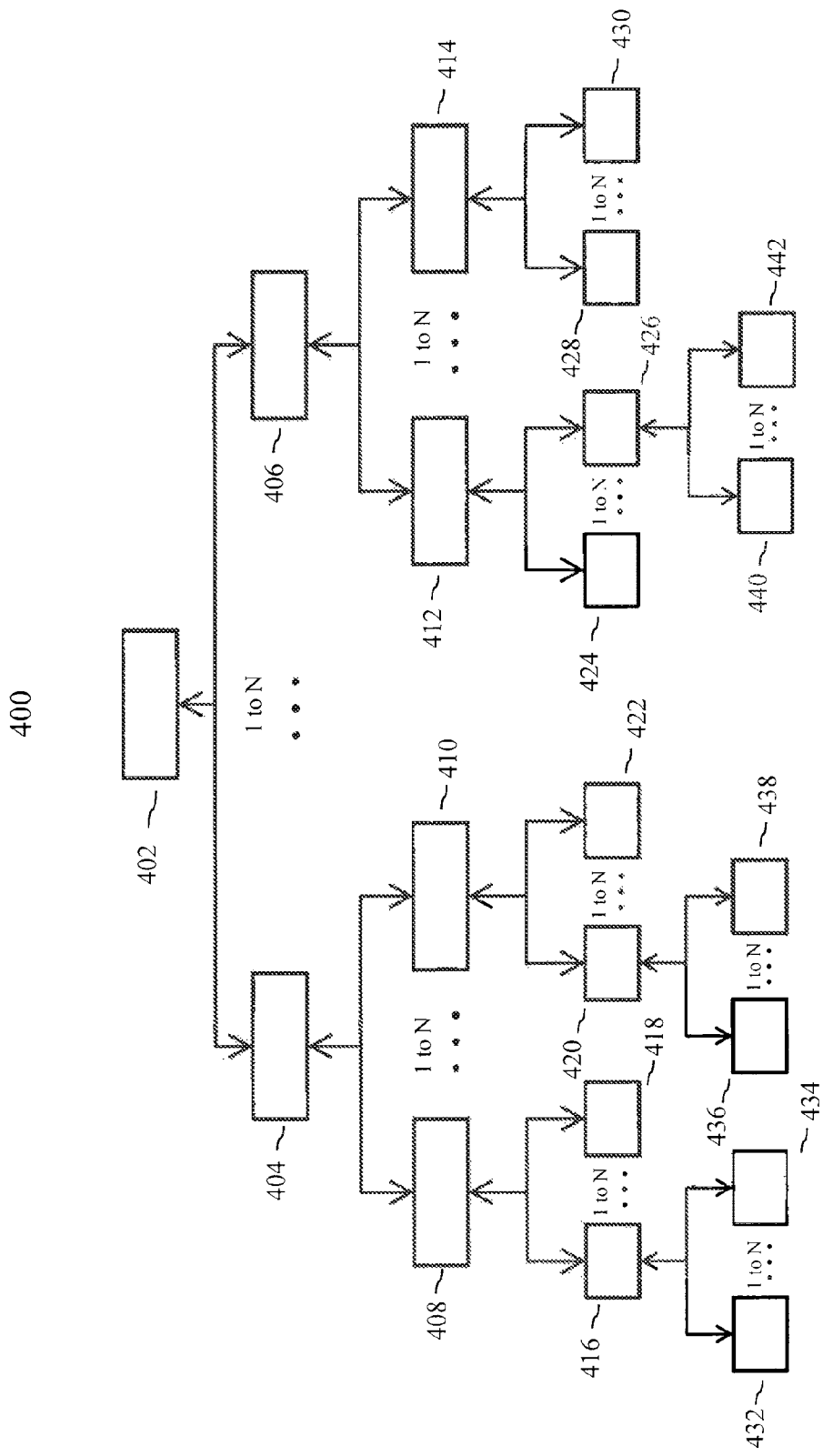
FIG. 4 is a diagram illustrating system architecture 400 for hybrid power control module 300, according to an embodiment.

FIG. 4 is a diagram illustrating system architecture 400 for hybrid power control module 300, according to an embodiment. In an embodiment, system architecture 400 may comprise a plurality of tiers in a tree architecture with each tier comprising a plurality of power assets. Power assets may comprise MCU 306, charge controllers 308, rectifiers 310, inverters 312 of hybrid power control module 300, or any combination thereof.

In an embodiment, a first tier of the system architecture 400 comprises power asset 402 which may comprise a MCU, a computer, a mobile device, or any combination thereof. Power asset 402 may be configured to receive signals from remote location 314. When power asset 402 receives a signal from remote location 314, power asset 402 may compile a data telegram, as described further in the discussion of FIG. 6. The data telegram may comprise commands for the power flow and power profiles for charge controllers 308, rectifiers 310, and inverters 312 of hybrid power control module 300 as described in the discussion of FIG. 2.

According to an embodiment, power asset 402 may send the data telegram to a second tier of the system architecture 400. The second tier of the system architecture 400 may comprise a plurality of power assets, such as power assets 404, 406, or any combination thereof. Power assets of the second tier of the system architecture 400 may comprise MCUs, charge controllers 308, rectifiers 310, inverters 312 of hybrid power control module 300, or any combination thereof. In an example embodiment, the second tier of system architecture 400 may comprise up to up to 16 power assets.

Figure 7:
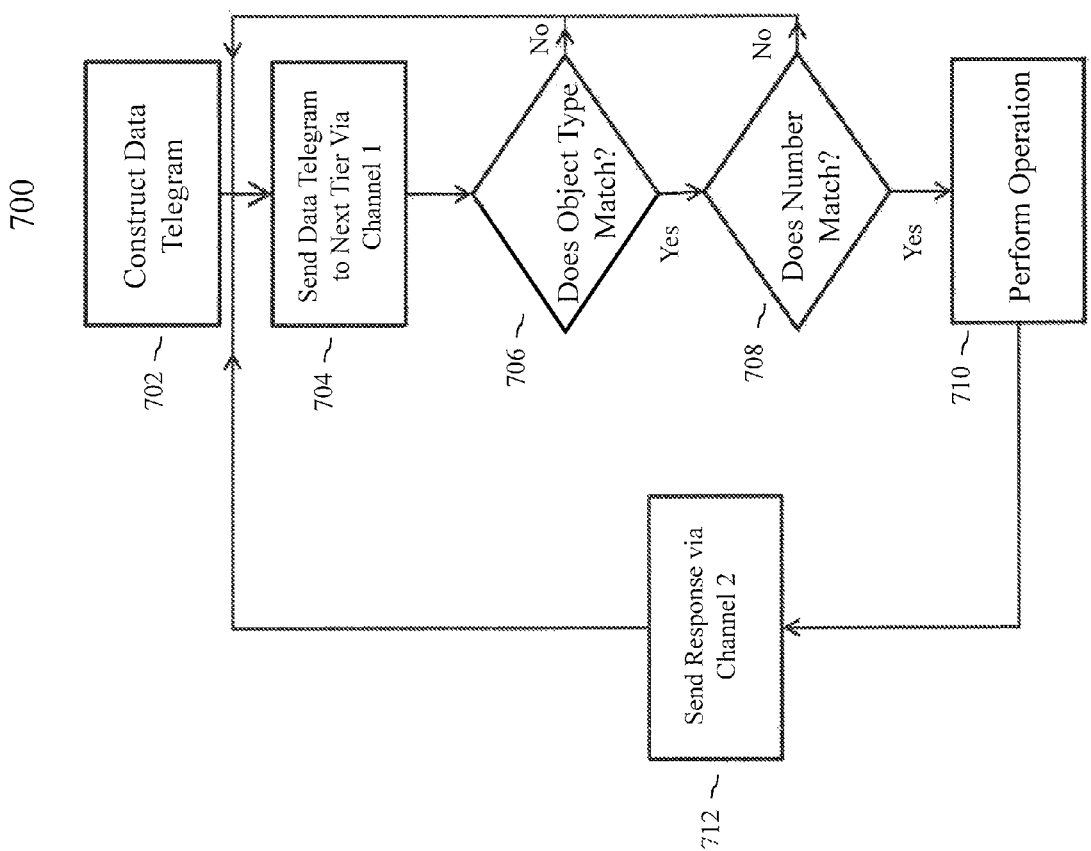
FIG. 7 is a flowchart illustrating a process for sending a data telegram between tiers of system architecture 400, according to an embodiment.

In an embodiment, each power asset of the second tier may process the data telegram received as discussed in the method of FIG. 7. Once the data telegram has been processed, each power asset of the second tier may send the data telegram to a third tier of the system architecture 400. The third tier of the system architecture 400 may comprise a plurality of power assets, such as power assets 408, 410, 412, 414, or any combination thereof power assets of the second tier of the system architecture 400 may comprise MCUs, charge controllers 308, rectifiers 310, inverters 312 of hybrid power control module 300, or any combination thereof.

According to an embodiment, each power asset of the second tier is connected to a group of assets of the third tier. For example, power asset 404 may be connected to power assets 408 and 410 of the third tier, and power asset 406 may be connected to power assets 412 and 414 of the third tier. In an example embodiment, each power asset of the second tier is connected to a group of up to 16 power assets of the third tier.

In an embodiment, after the power assets of the second tier have processed the data telegram as discussed in the method of FIG. 7, each power asset of the second tier may send the datagram to the group of power assets of the third tier for which it is connected. For example, power asset 404 may send the data telegram to power assets 408 and 410 and power asset 406 may send the data telegram to power assets 412 and 414.

In an embodiment, each power asset of the third tier may process the data telegram received from the second tier as discussed in the method of FIG. 7. Once the data telegram has been processed, each power asset of the third tier may send the data telegram to a fourth tier of the system architecture 400. The fourth tier of the system architecture 400 may comprise a plurality of power assets, such as power assets 416, 418, 420, 422, 424, 426, 428, and 430 or any combination thereof.

According to an embodiment, as with the second tier, each power asset of the third tier is connected to a group of assets of the fourth tier. For example, power asset 408 may be connected to power assets 416 and 418 of the fourth tier, power asset 410 may be connected to power assets 420 and 422 of the fourth tier, power asset 412 may be connected to power assets 424 and 426 of the fourth tier, and power asset 414 may be connected to power assets 428 and 430 of the fourth tier. In an example embodiment, each power asset of the third tier is connected to a group of up to 16 power assets of the fourth tier.

In an embodiment, after the power assets of the third tier have processed the data telegram as discussed in the method of FIG. 7, each power asset of the third tier may send the datagram to the group power assets of the fourth tier for which it is connected. For example, power asset 408 may send the data telegram to power assets 416 and 418, power asset 410 may send the data telegram to power assets 420 and 422, power asset 412 may send the data telegram to power assets 424 and 426, and power asset 414 may send the data telegram to power assets 428 and 430.

In an embodiment, each power asset of the fourth tier may process the data telegram received from the third tier as discussed in the method of FIG. 7. Once the data telegram has been processed, each power asset of the third tier may send the data telegram to a fifth tier of the system architecture 400. The fifth tier of the system architecture 400 may comprise a plurality of power assets, such as power assets 432, 434, 436, 438, 440, and 442 or any combination thereof.

According to an embodiment, the fourth tier and the fifth tier are likewise connected as the second tier to the third tier, or the third tier to the fourth tier, as demonstrated in FIG. 4. In an example embodiment, each power asset of the fourth tier may be connected to up to 16 power assets of the fifth tier.

In another embodiment, system architecture 400 may comprise a number of tiers likewise connected together as depicted in FIG. 4.

FIG. 5 is a diagram illustrating bi-directional communication between one through N tiers of system architecture 400, according to an embodiment. In an embodiment, each power asset allows for bi-directional communication. Each power asset within a tier of system architecture 400 comprises two signal lines. Signal lines may comprise receiver (RX) lines, transmitter (TX) lines, serial lines, buses, or any combination thereof—to name a few examples.

According to an embodiment, the tiers of system architecture 400, may transfer data over two data pathways in parallel, i.e. two streams of data may be transferred between the tiers simultaneously. A first data pathway may comprise data paths comprising connections between the first signal lines of each power asset between tiers within system architecture 400, and a second data pathway may comprise data paths comprising connections between the second signal lines of each power asset between tiers within system architecture 400.

For example a first data pathway between tier 1 502, tier 2 504, tier 3 506, and tier N 508 of system architecture 400 may comprise data paths 510, 514, and 518. Wherein data path 510 comprises the connections between the first signal lines of the power assets of tier 1 502 and tier 2 504, data path 514 comprises the connections between the first signal lines of the power assets of tier 2 504 and tier 3 506, and data path 518 comprises the connections between the first signal lines of the power assets of tier 3 506 and tier N 508.

As another example, a second data pathway between tier 1 502, tier 2 504, tier 3 506, and tier N 508 of system architecture 400 may comprise data paths 512, 516, and 520. Wherein data path 512 comprises the connections between the second signal lines of the power assets of tier 1 502 and tier 2 504, data path 516 comprises the connections between the second signal lines of the power assets of tier 2 504 and tier 3 506, and data path 520 comprises the connections between the second signal lines of the power assets of tier 3 506 and tier N 508.

According to an embodiment, a data telegram from MCU 306 may be sent to each tier using the first pathway of system architecture 400. While the data telegram is being sent between the tiers, the second signal pathway of system architecture 400 may be used by the power assets to send responses to MCU 306 as detailed in the method of FIG. 7.

In an embodiment, the bi-directional communication may be used by a power asset to communicate with other power assets in the system to determine its position in system architecture 400 and its role in hybrid power control module 300. The position may comprise the power asset's location in the tiered structure of system architecture 400 and the role may comprise power profiles sent from MCU 306. For example, a replacement power asset may request information from power assets to which it is connected. The requested information may comprise the position information of the power assets to which the replacement power asset is connected, the latest data telegram received, identification information of the power assets to which it is connected, or any combination thereof—to name a few examples.

According to another embodiment, the bi-directional communication may be used to create redundancy within system architecture 400. When a power asset with system architecture 400 deactivates or malfunctions, the bi-directional communication can be used to alert other power assets within system architecture 400 that such a deactivation or malfunction has occurred. For example, a power asset may detect that a malfunctioned power asset is no longer connected. The power asset may then alert, via the bi-directional communication, other power assets within the system architecture 400 that the malfunction has occurred, allowing the other power assets to compensate for the malfunction.

As an example, a power output from photovoltaic solar panels 204 may be fed to five MPPTs (power assets) within tier 3 of system architecture 400 that have received power profiles from MCU 306 to regulate the current to 50 A, for example, in order to charge batteries within power storages 218. To provide 50 A to the batteries, each of the 5 MPPTs may output 10 A to the batteries, for example. If one of the five MPPTs malfunction, other power assets within the system may alert, via the bi-directional communication of system architecture 400, the other four MPPTs that the malfunction has occurred. In response to the alert, the other four MPPTs may alter their power profiles to output 12.5 A each in order to provide 50 A to the batteries, for example.

FIG. 6 is a diagram illustrating data telegram 600, according to an embodiment. In an embodiment, data telegram 600 may comprise blocks 602, 604, 606, and 608. Block 602 may comprise synchronization bits, or a synchword. Synchronization bits may comprise data indicating the end of header information and the beginning the data, or frame, of the data telegram 600.

According to an embodiment, block 604 may comprise object type bytes. Object type bytes may comprise data indicating the type of power assets for which the data telegram is intended. For example, MCU 306 may send data telegram 600 instructing MPPTs of the second tier to change their power profile to control the current of photovoltaic solar panels 204 and output 10 A. In this case, block 604 of data telegram 600 may comprise object type bytes comprising data indicating the data telegram is meant for MPPTs of the second tier.

In an embodiment, block 606 may comprise data bytes. Data bytes may comprise data indicating commands to power assets. These commands may comprise changes to power profiles, request for responses, activation/deactivation requests, or any combination thereof—to name a few. For example, MCU 306 may send data telegram 600 instructing MPPTs of the second tier to change their power profile to control the current of photovoltaic solar panels 204 and output 10 A. In this case, block 606 of data telegram 600 may comprise data bytes comprising data indicating to change power profiles to control the current of photovoltaic solar panels 204 and output 10 A.

According to an embodiment, block 608 may comprise a number of objects for which an answer is requested. The answer requested may be status information, power profile information, connection information, or any combination thereof—to name a few. For example, MCU 306 may send a data telegram 600 instructing MPPTs of the second tier to change their power profile to control the current of photovoltaic solar panels 204 and output 10 A and requesting that five MPPTs of the second tier answer with status information. In this case, block 608 may comprise information indicating that five MPPTs are to respond with an answer with status information.

FIG. 7 is a flowchart illustrating a process for sending a data telegram in system architecture 400, according to an embodiment.

At block 702, an exemplary data telegram is constructed by MCU 306. For example, MCU 306 may construct a data telegram instructing MPPTs of the second tier to change their power profile to control the current of photovoltaic solar panels 206 each to output 10 A and that five MPPTs are to respond with an answer with status information. In this case, a data telegram would be constructed comprising block 604 that comprises data indicating the data telegram is meant for MPPTs of the second tier, block 606 that comprises data indicating to change power profiles to control the current of photovoltaic solar panels 204, and block 608 that comprises information indicating that five MPPTs are to respond with an answer with status information.

At block 704, the data telegram is sent to the next tier of data architecture 400 via the first communication path. For example, MCU 306 may send the data telegram to power assets of the second tier via the first communication path.

At block 706, the power assets that received the data telegram via the first communication path determine whether the object type data of the data telegram matches the type of the power asset that received the data telegram. For example, the power assets of the second tier may receive a data telegram comprising instructions that MPPTs of the second tier change their power profile to control the current of photovoltaic solar panels 204 and output 10 A and that five MPPTs of the second tier answer with status information. Each power asset of the second tier will then determine whether they match the object type of the data telegram. In this case, only assets that are MPPTs would determine that they match the object type.

If a power asset determines that it does not match the object type of the data telegram, the system will then repeat block 704 and send the data telegram to a next tier via the first communication path. If a power asset does determine that it does match the object type of the data telegram, the system will then move on to block 708.

At block 708, the power assets that matched the object type determine whether the number of assets indicated by the data telegram has been met. For example, the power assets of the second tier may receive a data telegram comprising instructions MPPTs of the second tier to change their power profile to control the current of photovoltaic solar panels 204 and output 10 A and that five MPPTs of the second tier answer with status information. Each power asset of the second tier that matched the object type will then determine whether five MPPTs have already responded to the data telegram. A power asset may determine this based on its position in the system architecture 400.

If a power asset determines that the number of assets has been met, the system will then repeat block 704 and send the data telegram to the next tier via the first communication path. If a power asset determines that the number of assets has not been met, the system will then move on to block 710.

At block 710, the power assets that matched the object type and determined the number of objects had not been met perform operations based on the data telegram. For example, the power assets of the second tier may receive a data telegram comprising instructions MPPTs of the second tier to change their power profile to control the current of photovoltaic solar panels 204 and output 10 A and that five MPPTs of the second tier answer with status information. In this case, power assets that matched the object type and determined the number of objects had not been met will change their power profile to control the current of photovoltaic solar panels 204 and output 10V.

At block 712, power assets that performed the operations based on block 606 of the data telegram, send a response, via the second communication path, to MCU 308. For example, the power assets of the second tier may receive a data telegram comprising instructions MPPTs of the second tier to change their power profile to control the current of photovoltaic solar panels 204 and output 10 A and that five MPPTs of the second tier answer with status information. In this case, power assets that performed the operations based on block 606 of the data telegram, send a response, via the second communication path, to MCU 308 comprising status information. The system will then repeat block 704 and send the data telegram to the next tier via the first communication path.

Figure 8:
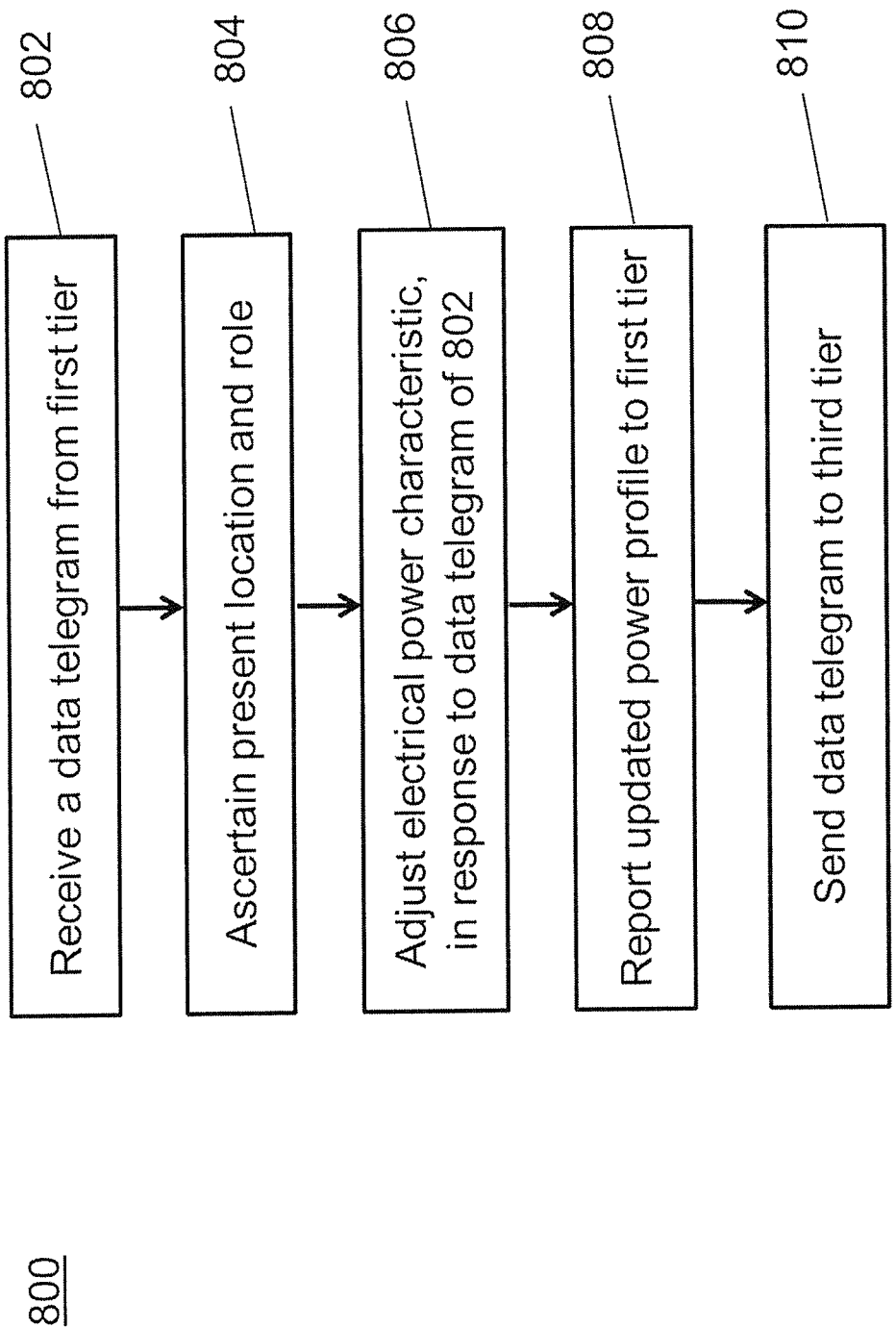
FIG. 8 is a flowchart illustrating an example of steps performed in response to an indication of a malfunctioning power asset within a tiered network, according to an embodiment.

FIG. 8 is a flowchart illustrating an example of steps performed in response to an indication of a malfunctioning power asset within a tiered network. According to this illustrative example embodiment, at 802, a first power asset in the second tier of a tiered network may receive a data telegram from the first tier via a first communication path. The data telegram may include information pertaining to a power profile, for example. At 804, the first power asset may determine or ascertain its present location and role within the tiered network. This step 804 may be done independently, or it may be done in response to receiving the data telegram from the first tier as in 802. At 806, further in response to receiving the data telegram as in 802, the first power asset may adjust an electrical power characteristic of the output of at least one power generation source according to a desired electrical power characteristic in the power profile. At 808, the first power asset of the second tier may be further configured to report an updated power profile back to the first tier via a second communications path. At 810, the first asset may be configured to send a data telegram via the first communications path to a third tier of the tiered network.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A power management control system comprising:
a plurality of power assets arranged in a tiered network having a tree architecture, wherein each power asset of the plurality of power assets comprises a first signal line communicatively coupled with a first communication path of the tiered network and a second signal line communicatively coupled with a second communication path of the tiered network, wherein each power asset of the plurality of power assets is configured to perform communication via at least one of its respective first signal line and its respective second signal line, wherein the communication comprises at least one of sending and receiving at least one data telegram;
a first tier comprising a first controller power asset configured to output transmit a power profile data telegram via the first communication path, the power profile data telegram configured to communicate a desired electrical power characteristic of an output of at least one power generation source communicatively coupled with the plurality of power assets in the tiered network;
a second tier comprising a first power asset configured to:
receive, via the first communication path, the power profile data telegram;
ascertain a present location and role of the first power asset within the tiered network, in response to receiving, via the first communication path of the tiered network, an indication of a malfunctioning power asset of the plurality of power assets, wherein the role of the first power asset comprises at least one power asset type, wherein the at least one power asset type identifies the first power asset as being configured to perform at least one of storing electrical charge, controlling electrical charge, regulating electrical power output, rectifying electrical power output, and inverting electrical power output;

adjust an electrical power characteristic of the output of the at least one power generation source according to the desired electrical power characteristic in the power profile communicated by the power profile data telegram, in response to the indication of the malfunctioning power asset of the plurality of power assets; and report, via the second communication path of the tiered network, an updated power profile to the first tier; and a third tier comprising a second power asset configured to receive, via the first communication path of the tiered network, the power profile data telegram from the second tier.

2. The system of claim 1, the first power asset of the second tier further configured to:

convert the output of the at least one power generation source to a current load type according to the power profile data telegram.

3. The system of claim 1, wherein the power profile data telegram comprises data relating to an electrical current requirement for a plurality of loads.

4. The system of claim 3, wherein the plurality of loads comprises at least one alternating-current load and at least one direct-current load.

5. The system of claim 4, wherein the plurality of loads require a plurality of electrical current requirements.

6. The system of claim 1, wherein the plurality of power assets comprises at least one hot-swappable module.

7. The system of claim 6, wherein the hot-swappable module is configured to perform at least one of storing electrical charge, controlling electrical charge, regulating electrical power output, rectifying electrical power output, and inverting electrical power output.

8. The system of claim 1, the first power asset further configured to adjust the electrical power characteristic of the output of the power generation source according to at least one environmental condition comprising solar irradiance or air mass.

9. The system of claim 1, wherein the malfunctioning power asset has been at least one of deactivated, disabled, disconnected, or malfunctioned.

10. The system of claim 9, wherein the indication is an alert.

11. In a tiered network comprising a controller and a plurality of power assets arranged in a tree architecture, wherein each power asset of the plurality of power assets comprises a first signal line communicatively coupled with a first communication path of the tiered network and a second signal line communicatively coupled with a second communication path of the tiered network, wherein each power asset of the plurality of power assets is configured to perform communication via at least one of its respective first signal line and its respective second signal line, wherein the communication comprises at least one of sending and receiving at least one data telegram, a system comprising:

in a first power asset of a second tier of the tiered network, at least one processor coupled to a memory and configured to:

receive, via the first communication path, a power profile data telegram, wherein the power profile data telegram is configured to communicate a desired power characteristic of an output of at least one power generation source;

ascertain a present location and role of the first power asset within the tiered network, in response to receiving, via the first communication path of the tiered network, an indication of a malfunctioning power asset of the plurality of power assets, wherein the role of the first power asset comprises at least one power asset type, wherein the at least one power asset type identifies the first power asset as being configured to perform at least one of storing electrical charge, controlling electrical charge, regulating electrical power output, rectifying electrical power output, and inverting electrical power output;

adjust the output of the at least one power generation source to the desired power characteristic according to the power profile data telegram, in response to the indication of the malfunctioning power asset, received via the first communication path of the tiered network;

report, via the second communication path of the tiered network, an updated power profile to the first tier of the tiered network; and send, by the first communication path of the tiered network, the power profile data telegram to a third tier of the tiered network.

12. The system of claim 11, wherein, to adjust the output, the at least one processor is further configured to:

change a power characteristic of a load connected to the power generation source according to the power profile data telegram.

13. The system of claim 12, wherein the data telegram comprises an electrical current requirement for a plurality of loads comprising at least one alternating-current load and at least one direct-current load.

14. The system of claim 11, wherein the power profile data telegram comprises data relating to a power requirement of a power storage.

15. The system of claim 11, wherein the plurality of power assets comprises any combination of at least one of a charge controller, a charge storage device, a power rectifier, a power inverter, a power regulator, or a power controller.

16. The system of claim 15, wherein the plurality of power assets comprises at least one hot-swappable module.

17. The system of claim 11, wherein the power generation source comprises at least one photovoltaic element.

18. The system of claim 11, the first power asset further configured to adjust the electrical power characteristic of the output of the power generation source according to at least one environmental condition comprising solar irradiance or air mass.

19. The system of claim 11, wherein the role further comprises at least one power profile sent to the at least one power asset from the controller.

20. The system of claim 11, wherein the malfunctioning power asset has been at least one of deactivated, disabled, disconnected, or malfunctioned.

21. The system of claim 19, wherein the indication is an alert.

22. In a tiered network comprising a controller in a first tier of the tiered network and a plurality of power assets arranged in a tree architecture, wherein each power asset of the plurality of power assets comprises a first signal line communicatively coupled with a first communication path of the tiered network and a second signal line communicatively coupled with a second communication path of the tiered network, wherein each power asset of the plurality of power assets is configured to perform communication via at least one of its respective first signal line and its respective second signal line, wherein the communication comprises at least one of sending and receiving at least one data telegram, a method comprising:
- compiling a power profile data telegram, wherein the power profile data telegram comprises a plurality of blocks;
- sending, via the first communication path of the tiered network, the power profile data telegram from the first tier to a second tier of the tiered network, wherein a first power asset of the second tier of the tiered network is configured to update a power profile according to at least one block of the power profile data telegram, wherein the power profile comprises at least one updated electrical power characteristic of the first power asset of at least one further tier other than the first tier of the tiered network;
- ascertaining a present location and role of the first power asset within the tiered network, in response to the indication of a malfunctioning power asset of the plurality of power assets; and
- adjusting the output of the power generation source to the updated electrical power characteristic according to the power profile data telegram, in response to an indication, received by the first communication path of the tiered network, of the malfunctioning power asset of the plurality of power assets;
- receiving, via the second communication path of the tiered network, an updated power profile from the first power asset of the second tier of the tiered network.

23. The method of claim 22, wherein the first power asset of the second tier of the tiered network is further configured to:
- send, via the first communication path of the tiered network, the power profile data telegram to a third tier of the tiered network.

24. The method of claim 22, wherein the first power asset of the second tier of the tiered network comprises a maximum power point tracker.

25. The method of claim 24, wherein the update comprises a further update to the power profile, wherein the further update is calculated by the maximum power point tracker in response to the power profile data telegram.

26. The method of claim 22, further comprising:
- determining the tier of a power asset of the tiered network based upon data flows of the first communication path of the tiered network and the second communication path of the tiered network.

27. The method of claim 22, wherein at least one tier of the tiered network comprises a plurality of electrical charge storage devices, wherein the electrical charge storage devices are charged according to at least one block of the power profile data telegram.

28. The method of claim 22, the first power asset further configured to adjust the electrical power characteristic of the output of the power generation source according to at least one environmental condition comprising solar irradiance or air mass.

29. The method of claim 22, wherein the malfunctioning power asset has been at least one of deactivated, disabled, disconnected, or malfunctioned.

30. The method of claim 29, wherein the indication is an alert.

* * * * *